Figure 1:
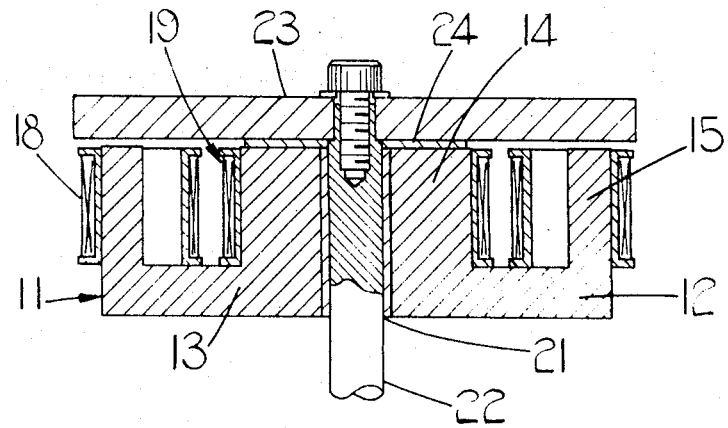

United States Patent [19]
Williams et al.

[11] 3,781,580
[45] Dec. 25, 1973

[54] INDUCTOR ALTERNATOR

[75] Inventors: Malcolm Williams, Solihull; Charles Peter Cockshott, Coventry, both of England

[73] Assignee: Joseph Lucas (Industries) Limited, Birmingham, England

[22] Filed: July 28, 1972

[21] Appl. No.: 276,160

[30] Foreign Application Priority Data
July 31, 1971 Great Britain............... 36,123/71

[52] U.S. Cl............................. 310/168, 310/268
[51] Int. Cl. ........................................ H02k 19/20
[58] Field of Search................. 310/168, 268, 156, 310/155, 254, 258, 259, 218, 216, 165

[56] References Cited
UNITED STATES PATENTS

| | | | |
|---|---|---|---|
| 2,820,915 | 1/1958 | Mathews............................ | 310/168 |
| 3,243,621 | 3/1966 | Wesolowski....................... | 310/168 |
| 3,261,998 | 7/1966 | Bosco, Jr. et al.................. | 310/165 |
| 3,428,840 | 2/1969 | Kober................................ | 310/156 X |
| 3,231,773 | 1/1966 | Henry-Baudot.................... | 310/268 |
| 3,215,876 | 11/1965 | Nichols et al..................... | 310/156 |

Primary Examiner—D. F. Duggan
Attorney—John C. Holman et al.

[57] ABSTRACT

A transducer includes a stator formed of a magnetisable material and arranged to define at least one pair of adjacent pole pieces, and a rotor formed of a magnetisable material and arranged to define at least one pole piece. The rotor is movable angularly with respect to the stator from a first position, in which the one rotor pole piece is aligned with but spaced from one of the pair of stator pole pieces by a predetermined air gap, to a second position, in which the one rotor pole piece is aligned with but spaced from the other of the pair of stator pole pieces by a predetermined air gap. The transducer further includes an energising winding for connection to an a.c. source and magnetically coupled with the rotor, and an output winding surrounding one of the pair of stator pole pieces, whereby on energisation of the energising winding, angular movement of the rotor varies the relative flux densities in the pair of stator pole pieces, and hence the voltage induced in the output winding will be dependent upon the angular position of the rotor.

12 Claims, 4 Drawing Figures

INDUCTER ALTERNATOR

This invention relates to transducers.

A transducer, according to the invention, includes a stator formed of a magnetisable material and arranged to define at least one pair of adjacent pole pieces, a rotor formed of a magnetisable material and arranged to define at least one pole piece, said rotor being movable angularly with respect to said stator from a first position, in which said one rotor pole piece is aligned with but spaced from one of said pair of stator pole pieces by a predetermined air gap, to a second position, in which said one rotor pole piece is aligned with but spaced from the other of said pair of stator pole pieces by a predetermined air gap, an energising winding for connection to an a.c. source and magnetically coupled with said rotor, and an output winding surrounding one of said pair of stator pole pieces, whereby on energisation of said energising winding, angular movement of said rotor varies the relative flux densities in said pair of stator pole pieces, and hence the voltage induced in said output winding will be dependent upon the angular position of said rotor.

Preferably said stator is in the form of a cup-shaped member having therein a central core, the wall of the cup-shaped member defining said pair of adjacent pole pieces together with a further pair of adjacent pole pieces, a further output winding surrounding one of said further pair of adjacent pole pieces, and the rotor extending between the central core and the wall of the cup-shaped member and carrying a further pole-piece, whereby angular movement of the rotor, in use, varies the relative flux densities in said further adjacent pole pieces, so that the voltage induced in the further output winding, in use, is dependent upon the angular position of the rotor.

Preferably, the first mentioned output winding and said further output winding are connected in series with one another so that the voltages induced in the output windings, in use, are summed.

Figure 2:
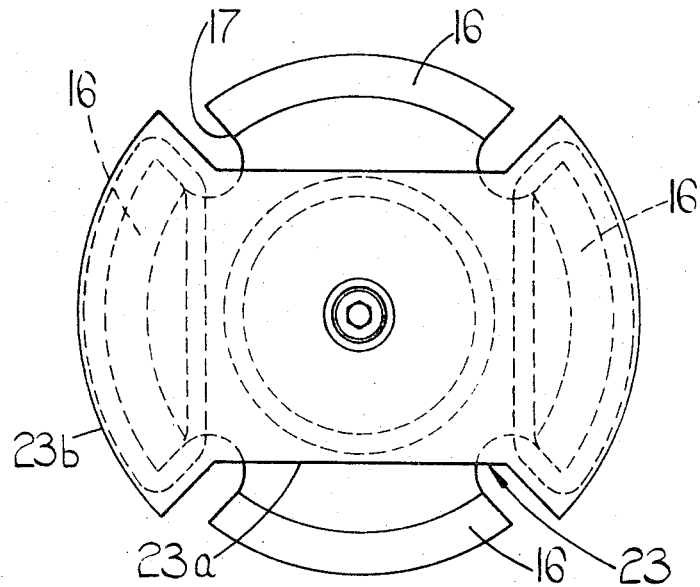
Figure 3:
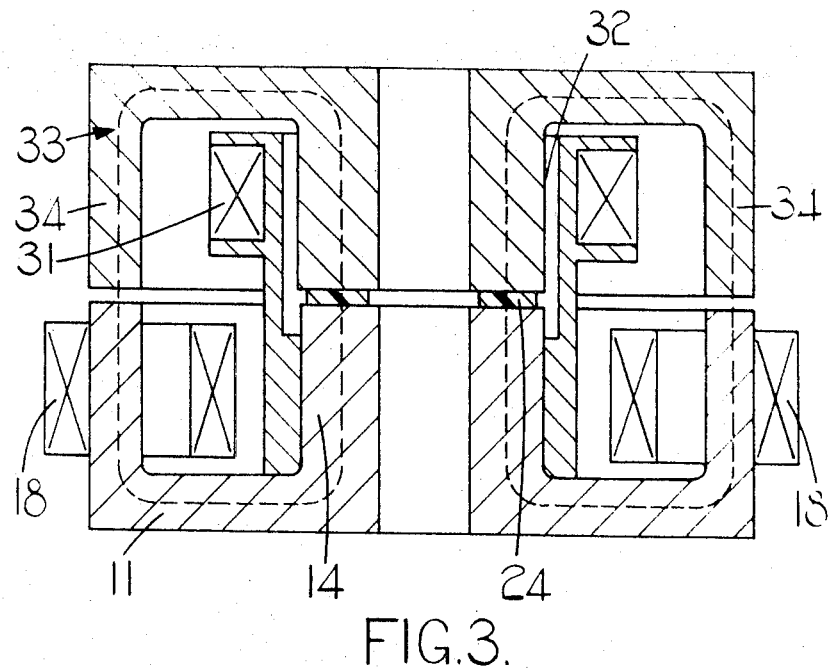
Figure 4:
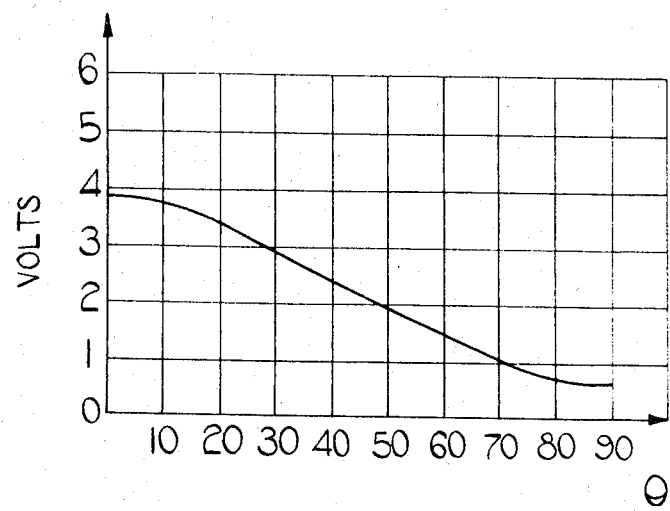

In the accompanying drawings,

FIG. 1 is a sectional view of a transducer according to a first example of the invention, FIG. 2 is a plan view of FIG. 1, FIG. 3 is a sectional view of a transducer according to a second example of the invention, and FIG. 4 is a graph illustrating the relationship between the output voltage and the angular position of the rotor for a transducer according to the invention.

Referring to FIGS. 1 and 2, in a first example of the invention, the transducer includes a stator 11 formed of a manganese/zinc ferrite as sold by Mullard Ltd., as type A5. The stator 11 is in the form of a substantially cup-shaped body 12 from the base 13 of which extends an integral, hollow, cylindrical core 14. The axis of the core 14 is arranged to be parallel with and centrally disposed with respect to the circular wall 15 of the cup-shaped body 12 and the free ends of the core 14 and the wall 15 respectively are arranged to lie in a plane parallel with the base 13. The wall 15 of the body 12 is arranged to define four equi-angularly spaced pole pieces 16 and a groove 17 extending parallel with the axis of the core 14 is formed in the wall 15 intermediate each pair of adjacent pole pieces 16. The grooves 17 serve to accommodate output windings 18 which surround one diametrically opposite pair of the pole pieces 16. The core 14 of the stator 11 also defines a pole piece of the stator 11 and an energising winding 19 surrounds the core 14.

Positioned within the bore in the hollow core 14 is a p.t.f.e. bearing sleeve 21 and extending through the sleeve 21 for movement relative to the stator 11 is a non-magnetic and preferably brass drive shaft 22. The drive shaft 22 extends from the free end of the core 14 and is non-rotatably secured to a rotor 23 formed of the same manganese/zinc ferrite as the stator 11. The winding 19 is magnetically coupled with the rotor 23 and the rotor which has a pair of opposed planar surfaces includes a central rectangular portion 23a provided at each of a pair of opposite edges with an arcuate portion 23b defining a pole piece of the rotor. The portions 23b are each arranged to define part of a sector of a circle centred on the axis of the core 14 but of radius greater than the radius of the wall 15 so that the rotor 23 extends between the core 14 and the wall 15. Moreover, the arcuate length of each arcuate portion 23b is greater than the arcuate length of each pole piece of the stator so that when said arcuate portion is axially aligned with one of said stator pole pieces said arcuate portion extends partly over gaps defined between said one stator pole piece and a pair of adjacent stator pole pieces. Positioned between the rotor 23 and the core 14 is a p.t.f.e. washer 24 which serves to permit angular movement of the rotor relative to the stator 11 and also provides an air gap between each rotor pole piece and the wall 15 of the stator 11.

In use, the energising winding 19 is connected to an a.c. source and the shaft 22 is coupled to an angularly movable member (not shown), the angular position of which is to be measured. Thus, angular movement of said member is transmitted by the shaft 22 to the rotor 23 so as to move the rotor angularly relative to the pole pieces 16. By virtue of the a.c. signal supplied to the winding 19, there is a magnetic flux linkage between the rotor pole pieces 23b and the pole pieces 16 so that variation in the angular position of the rotor with respect to the pole pieces 16 varies the flux densities in the pole pieces 16 respectively. Thus the voltage induced in the output windings 18 will be dependent upon the angular position of the rotor 23 and hence on the angular position of said angularly movable member. Preferably, the output windings 18 are connected together in series in such a manner that the outputs from the windings, in use, are summed. In this way, it is possible to overcome the effect of any variation in the air gap between the wall 15 and the rotor pole pieces 23b due to tilt of the rotor as the rotor is moved angularly in use.

Referring now to FIG. 3, there is shown a transducer which corresponds closely to that described above and accordingly, the same reference numerals are used in FIG. 3 to indicate corresponding parts of the transducer described with reference to FIGS. 1 and 2. However, by way of contrast to the transducer according to the first example, the transducer shown in FIG. 3 is provided with an energising winding 31 which, instead of surrounding the core 14 of the stator 11, is mounted above the core 14 on an extension thereof and surrounds the centrally disposed limb 32 of an inverted "E" shaped rotor 33, the free edges of the three limbs of the rotor being disposed adjacent to the stator 11. The winding 31 is, however, magnetically coupled with the "E" shaped rotor 33 and the outer limbs 34 of the "E" shaped rotor define respective pole pieces of the rotor so that operation of the transducer is the same as that described above.

It is to be appreciated that the transducer according to the invention provides an output which varies substantially linearly with the angular position of the rotor over a wide range of angular positions of the rotor. The highly desirable performance of the transducer according to the invention is illustrated in FIG. 4, which is a graph of output voltage drawn against angular position of the rotor for a square wave input to the energising winding.

It will be appreciated that, although in the examples given the air gap between each pole piece of the rotor and the wall 15 of the stator 11 is maintained by a washer, appropriate bearings between rotor and stator can be used to provide the air gap, and the washer eliminated.

It will be appreciated that the rotor may be attached to the shaft by means other than that described, for example, the magnetising material could be secured, such as by use of an adhesive, to a non-magnetic framework.

We claim:

1. A transducer including a stator which is formed of magnetisable material and which is in the form of a cup-shaped member having therein a central core the wall of the cup-shaped member defining two pairs of adjacent pole pieces, a rotor formed of magnetisable material and extending between the central core and the wall of the cup-shaped member and defining two pole pieces, the rotor being movable angularly with respect to said stator from a first position, in which the rotor pole pieces are aligned with, but spaced from one of each of said pairs of stator pole pieces respectively by a predetermined air gap, to a second position, in which said rotor pole pieces are aligned with, but spaced from the other pole piece of each of said pair of stator pole pieces respectively by a predetermined air gap, a single energising winding for connection to an a.c. source and magnetically coupled with said rotor, and a pair of output windings surrounding only one diametrically opposite pair of pole pieces which are equiangularly spaced, whereby upon energisation of said energising winding, angular movement of said rotor varies the relative flux densities in said pair of stator pole pieces, and hence the voltage induced in said output winding will be dependent upon the angular position of said rotor.

2. A transducer as claimed in claim 1 wherein the surface of the rotor facing the pole pieces of the stator is planar.

3. A transducer as claimed in claim 1 wherein the two output windings are connected in series with one another so that the voltages induced in the output windings, in use, are summed.

4. A transducer as claimed in claim 1 wherein said rotor includes a central rectangular portion provided at each of a pair of opposite sides with an arcuate portion defining a pole piece of the rotor.

5. A transducer as claimed in claim 4 wherein the arcuate length of each arcuate portion is greater than the arcuate length of each pole piece of the stator so that when said arcuate portion is axially aligned with one of said stator pole pieces said arcuate portion extends partly over gaps defined between said one stator pole piece and a pair of adjacent stator pole pieces.

6. A transducer as claimed in claim 1 wherein the rotor is E-shaped and wherein the two outer limbs of the rotor define pole pieces of the rotor.

7. A transducer as claimed in claim 6 wherein the free edges of the three limbs of the rotor are disposed adjacent to the stator.

8. A transducer as claimed in claim 7 wherein said energising winding is wound about the central limb of the E-shaped rotor.

9. A transducer as claimed in claim 8 wherein the energising winding is wound on an extension of the stator core so as to surround the central limb of the rotor.

10. A transducer as claimed in claim 1 wherein said rotor is mounged for rotation about the axis of said central core.

11. A transducer as claimed in claim 10 wherein said central core is hollow, said rotor being mounted on a shaft rotatable with said hollow core.

12. A transducer as claimed in claim 11 wherein said shaft is formed of non-magnetic material.

* * * * *